US012583625B1

(12) United States Patent
Goetz et al.

(10) Patent No.: US 12,583,625 B1
(45) Date of Patent: Mar. 24, 2026

(54) SYSTEMS AND METHODS FOR DETECTING AIRCRAFT MAGNETO FAILURE

(71) Applicants:Joseph R Goetz, Gilbert, AZ (US);
Christopher B Goetz, Gilbert, AZ (US)

(72) Inventors: Joseph R Goetz, Gilbert, AZ (US);
Christopher B Goetz, Gilbert, AZ (US)

( * ) Notice: Subject to any disclaimer, the term of this patent is extended or adjusted under 35 U.S.C. 154(b) by 0 days.

(21) Appl. No.: 19/389,686

(22) Filed: Nov. 14, 2025

Related U.S. Application Data

(60) Provisional application No. 63/739,801, filed on Dec. 30, 2024.

(51) Int. Cl.
| | |
|---|---|
| *F02P 17/00* | (2006.01) |
| *B64D 33/00* | (2006.01) |
| *B64D 45/00* | (2006.01) |
| *B64F 5/60* | (2017.01) |
| *G07C 5/00* | (2006.01) |

(52) U.S. Cl.
CPC ................ B64F 5/60 (2017.01); B64D 33/00 (2013.01); B64D 45/00 (2013.01); G07C 5/006 (2013.01); G07C 5/008 (2013.01); *B64D 2045/0085* (2013.01)

(58) Field of Classification Search
CPC ........... B64F 5/60; B64D 33/00; B64D 45/00; B64D 2045/0085; G07C 5/006; G07C 5/008
See application file for complete search history.

(56) References Cited

U.S. PATENT DOCUMENTS

| | | | | |
|---|---|---|---|---|
| 4,365,609 A | * | 12/1982 | Toyama .................. | F02P 7/026 |
| | | | | 123/635 |
| 4,899,579 A | * | 2/1990 | Sweppy .................. | F02P 17/02 |
| | | | | 73/114.62 |
| 5,004,984 A | * | 4/1991 | Becker ................. | G01R 33/028 |
| | | | | 324/226 |
| 6,204,770 B1 | * | 3/2001 | Johnson ................ | F02D 41/222 |
| | | | | 73/35.03 |
| 2004/0257085 A1 | * | 12/2004 | McQueeney ........... | F02P 17/12 |
| | | | | 324/402 |
| 2011/0254562 A1 | * | 10/2011 | Hobelsberger ......... | G01R 31/52 |
| | | | | 324/521 |

* cited by examiner

*Primary Examiner* — Thang X Le
(74) *Attorney, Agent, or Firm* — Accelerate IP LLC

(57) ABSTRACT

A system and method for detecting failures in an aircraft ignition specifically a magneto. The system comprises at least one inductive pickup with a coil and lead that captures electromagnetic fields generated during engine operation. The coil generates an electrical signal in response to the captured electromagnetic field, which is transmitted through the lead to a signal processing system. The signal processing system includes a converter and/or interrogator with signal conditioning circuitry that amplifies and filters the signal to detect magneto degradation or failure. The system provides real-time feedback through indicator lights that change color based on operational status and audible alerts for failure conditions. The system supports multi-engine configurations with multiple independent inductive pickups and can transmit magneto status information to external aircraft monitoring systems for comprehensive health monitoring.

20 Claims, 11 Drawing Sheets

SYSTEMS AND METHODS FOR DETECTING AIRCRAFT MAGNETO FAILURE

CROSS REFERENCE TO RELATED APPLICATIONS

This application claims benefit from currently U.S. Provisional Application No. 63/739,801 titled "Systems and Methods for Detecting Aircraft Magento Operation in Flight and on the Ground" and having a filing date of Dec. 30, 2024, all of which is incorporated by reference herein.

FIELD OF THE INVENTION

The present invention relates to aircraft ignition systems, and more specifically to systems and methods for detecting magneto failure in aircraft engines during both flight operations and ground operations.

BACKGROUND OF THE INVENTION

Aircraft piston engines typically employ dual magneto ignition systems to provide reliable spark ignition for engine operation. Each magneto is an independent, self-contained ignition system that generates electrical energy through electromagnetic induction to fire spark plugs. The dual magneto configuration provides redundancy critical for flight safety, allowing continued engine operation even if one magneto fails. Despite their mechanical simplicity and general reliability, magnetos are subject to various failure modes that can compromise engine performance and flight safety. Traditional magneto testing has primarily relied on periodic checks by grounding out one magneto, then the other. This switching from dual magneto operation to single magneto operation should produce a reduction in RPM wherein the user is actually turning off the magneto to test it. However, these conventional testing methods have proven inadequate for detecting certain types of magneto degradation and failure modes, particularly those that manifest under specific operating conditions.

Currently, magneto testing is performed primarily on the ground using standardized bench testing procedures and static operational evaluations. Existing testing protocols do not provide means for testing magnetos during in-flight failure scenarios. This limitation prevents comprehensive assessment of how magneto systems respond to the complex combination of altitude-induced pressure changes, flight-induced vibrations, temperature variations, and electrical load fluctuations that occur simultaneously during aircraft operation. The absence of in-flight failure testing capabilities results in incomplete understanding of magneto failure modes and reliability characteristics under actual operational conditions and does not allow the pilot to see if the magnetos have failed until they check them before the next flight.

One significant failure mode that has emerged in service involves magneto output loss due to overheating. There have been documented cases of magnetos overheating during operation, resulting in temporary magneto failure that can critically affect engine performance. This failure mode is particularly concerning because it can occur unpredictably during flight operations when engines are operating at high power settings and elevated temperatures.

The root cause of this temperature-induced failure can be attributed to changes in the temperature coefficient of resistance in the copper wiring used in magneto construction. Magnetos are constructed with many turns of copper wiring in the secondary coil to generate the high voltage required for spark plug ignition. As a magneto heats up during operation, the electrical resistance of the copper wiring in the coil increases proportionally with temperature, following the positive temperature coefficient of copper. This increase in resistance causes a corresponding decrease in magneto output voltage and current, which can result in weak or completely absent spark generation.

Other issues pilots have reported are situations where engines could not be started when hot due to weak or absent spark output from overheated magnetos. In these instances, the affected magneto would only resume normal operation after cooling down to lower temperatures, allowing the copper coil resistance to return to normal levels and restore adequate electrical output. Investigation of these failures revealed that certain magneto coils are particularly susceptible to very high temperatures encountered during normal engine operations. The thermal environment in aircraft engine compartments can be severe, with magnetos subjected to both direct heat from engine cylinders and radiant heat from exhaust systems. Additionally, reduced cooling airflow during ground operations, taxi operations, and certain flight conditions can exacerbate heating problems.

Existing magneto testing procedures have proven inadequate for detecting temperature-related failures and other complex failure modes. Standard ground testing typically involves simple functional checks performed under ambient temperature conditions that do not replicate the thermal stresses encountered during actual flight operations. These conventional tests fail to reveal magneto degradation that occurs specifically under elevated temperature conditions. Furthermore, traditional mag tests only measure gross performance differences and may not detect subtle degradation in magneto output that could affect engine performance under critical flight conditions. The binary nature of conventional testing (pass/fail based on RPM drop) does not provide insight into the actual electrical performance characteristics of the magnetos or their susceptibility to environmental factors.

Recent developments have shown that bench testing of magnetos by simulating in-flight conditions including heat, altitude, and vibration can reveal performance issues not easily detected by simple ambient temperature tests. Such comprehensive testing has uncovered magneto deficiencies that would not be apparent under standard testing protocols but could manifest as failures during critical flight operations. The aviation industry requires more sophisticated methods for detecting and predicting magneto failures before they occur in flight. Current reactive maintenance approaches, where magneto problems are only addressed after failure symptoms appear, pose unnecessary risks to flight safety and can result in costly emergency landings or flight cancellations.

There exists a need in the art for systems and methods that can detect magneto degradation and failure in real-time during both flight operations and ground operations.

SUMMARY OF THE INVENTION

The present invention provides a system and method for detecting failures in an ignition system of an engine, particularly magneto systems used in aircraft. The system can utilize at least one inductive pickup that comprises at least one coil and at least one lead, where the coil can be positioned near ignition components to capture electromagnetic fields generated during engine operation. The inductive pickup can generate an electrical signal in response to the captured electromagnetic field, which can then be processed to detect degradation or failure of the magneto.

The ignition system can comprise an ignition component having a magneto coupled to a distributor block, where the magneto can generate high voltage electricity that can be distributed through the distributor block to spark plugs for engine ignition. The system can include at least one signal processing system coupled to the inductive pickup, where the signal processing system can comprise a converter and/or an interrogator. The converter can include a signal conditioning circuit that can amplify and filter the electrical signal received from the inductive pickup before transmitting it to the interrogator for analysis. This signal conditioning can include bandpass filtering that can isolate electromagnetic signatures from high voltage sources detected via electromagnetic induction through the inductive pickup, where the filtering can reject interference from other aircraft systems while passing frequencies corresponding to oscillating electric fields that can induce voltage variations in the inductive pickup.

The inductive pickup can be designed for easy installation and versatile placement. The coil can be sized to wind around a terminal to form an inductive pickup antenna that can detect varying magnetic fields generated by the magneto voltage source. The coil can be expanded to open and positioned around various components consisting of at least one of a terminal, a center stem, a center of a spark plug wire harness, or a spark plug, and then released to contract and securely engage the component through spring tension. The lead from the inductive pickup can be routed through apertures on the spark plug wire harness for clean and secure installation, ensuring proper signal transmission without interference.

The system can provide multiple forms of feedback to indicate magneto operational status. The signal processing system can be coupled to at least one indicator light that can illuminate one color when proper magneto operation is detected and can illuminate a different color when a failure is detected, providing immediate visual feedback to the operator. Additionally, the system can include an audible tone generator that can produce an audible alert when a failure is detected, ensuring that critical magneto failures can be immediately recognized even when visual indicators may not be in the operator's direct line of sight. The system can further include a test button that can be operatively connected to the interrogator to initiate a magneto test sequence when actuated, allowing for on-demand verification of both the magneto's functionality and the monitoring system's operational status.

The system can continuously monitor magneto performance and can provide real-time feedback regarding operational status, enabling proactive detection of degradation before complete failure occurs. The signal processing system can include an override function that can enable real-time monitoring of magneto signals without processing delays, ensuring that critical failure information can be immediately available to the operator without any latency that might compromise safety. The system can also include a communication interface that can be configured to transmit magneto status information to external aircraft monitoring systems, enabling integration with broader aircraft health monitoring infrastructure and allowing for remote diagnostics and trend analysis.

For multi-engine aircraft configurations, the system can comprise multiple inductive pickups to detect multiple magneto systems simultaneously. The system can include a first inductive pickup and a second inductive pickup, where the first inductive pickup can be positioned on a first engine and the second inductive pickup can be positioned on a second engine to detect the magneto status of both engines simultaneously. The signal processing system can comprise independent first and second signal processing systems coupled to the respective inductive pickups, where the first signal processing system and the second signal processing system can be independent, allowing for isolated monitoring of each engine's magneto performance and preventing cross-contamination of signals between different engine monitoring channels.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims. Aspects and applications of the invention presented here are described below in the drawings and detailed description of the invention.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF DRAWINGS

A more complete understanding of the present invention may be derived by referring to the detailed description when considered in connection with the following illustrative figures. In the figures, like reference numbers refer to like elements or acts throughout the figures.

Figure 1:
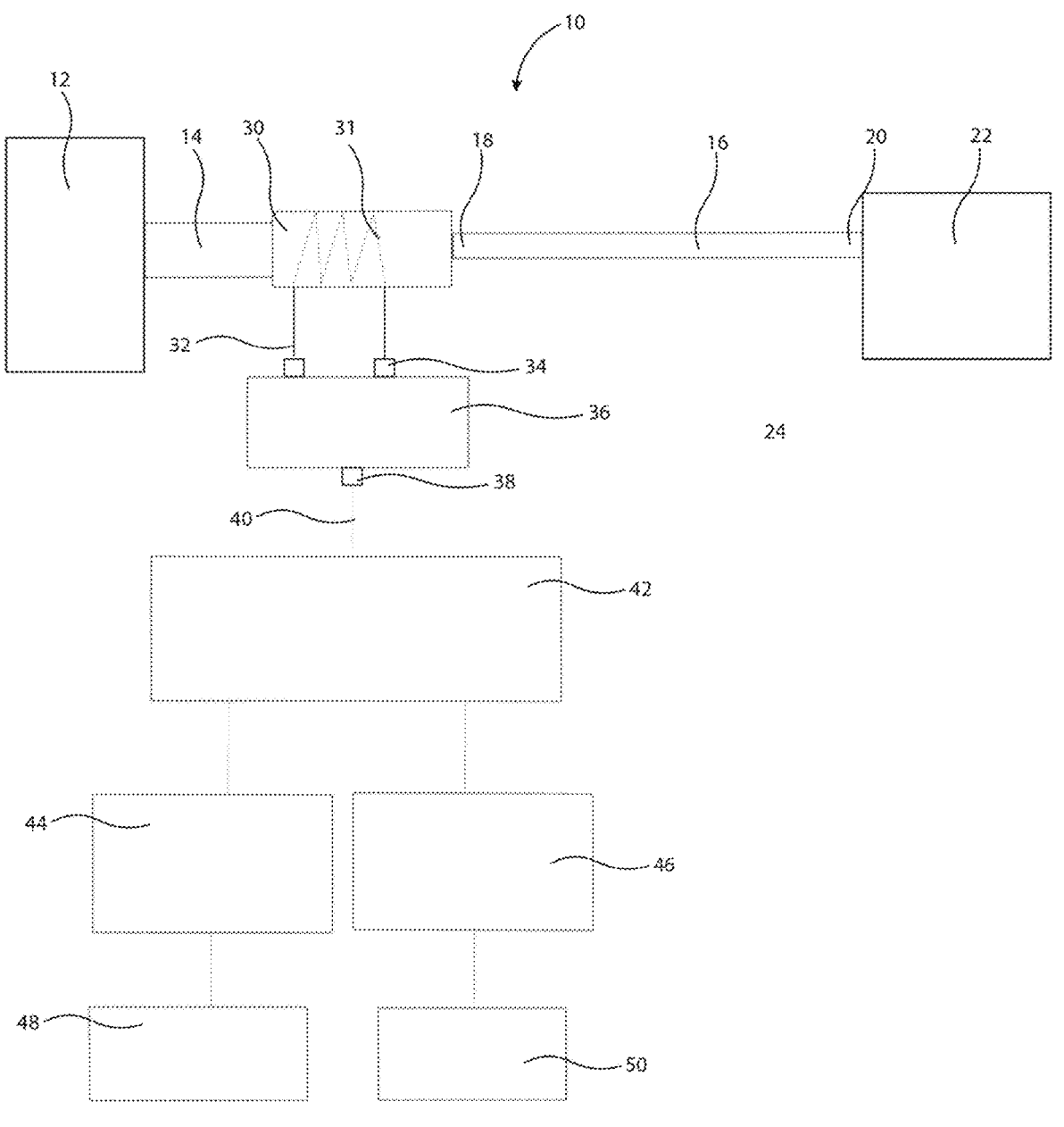
FIG. 1 shows a diagram of a system for detecting magneto failure in aircraft engines in accordance to one or more embodiments.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

Initially referring to FIGS. 1-5 and FIG. 9, a system for detecting aircraft magneto failure in flight and on the ground is shown generally at 10. The aircraft can have an aircraft engine can comprise of and can have at least one spark plug 14 coupled to it. The spark plug can have at least one spark plug lead 16 having a first end 18 and a second end 20 wherein the at least one spark plug lead can be coupled to the at least one spark plug 14 on the first end and coupled to a spark plug wire harness 15 on the second end. The spark plug wire harness 15 can be coupled to a magneto 22 which can be coupled to a distributor block 23 wherein the distributor black has at least one terminal 25 wherein at least one plug wires 17 can be inserted into or coupled to the at least one terminal 25. The magneto 22 can generate an electrical current through electromagnetic induction as its rotating magnet assembly creates a changing magnetic field within a primary coil windings, inducing a low-voltage current that is then stepped up by a transformer coil to produce high-voltage electrical energy sufficient to create an ignition spark across electrodes of the at least one spark plug 14 coupled to the engine 12 combustion chamber.

Figure 4:
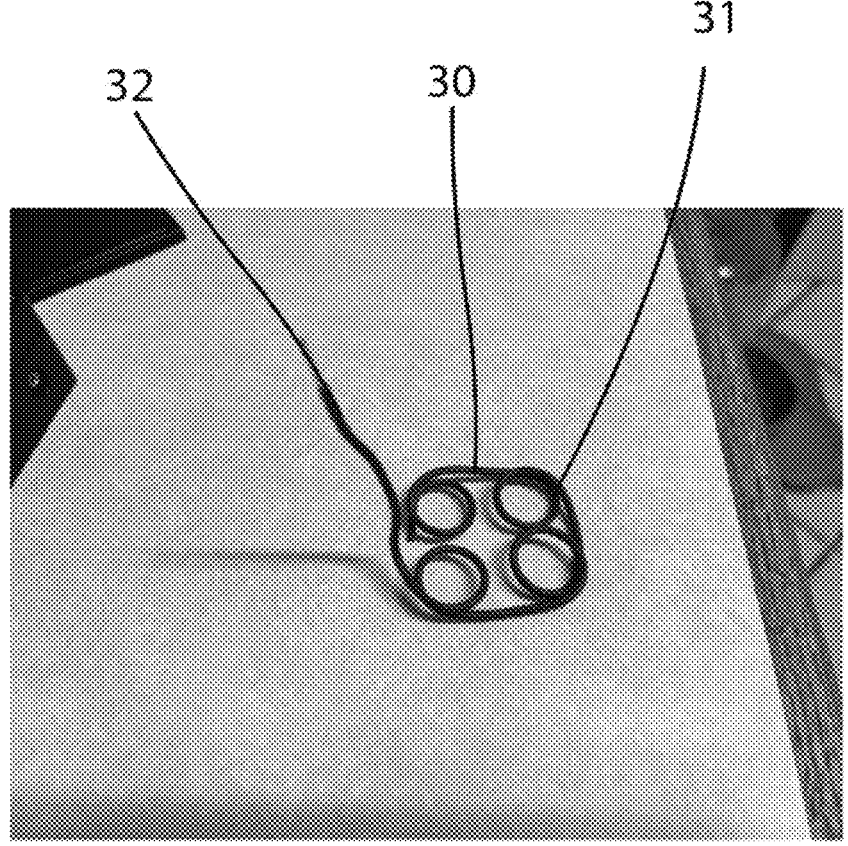
FIG. 4 shows a isometric view of an inductive pickup for a system for detecting aircraft magneto failure in accordance to one or more embodiments.
Figure 5:
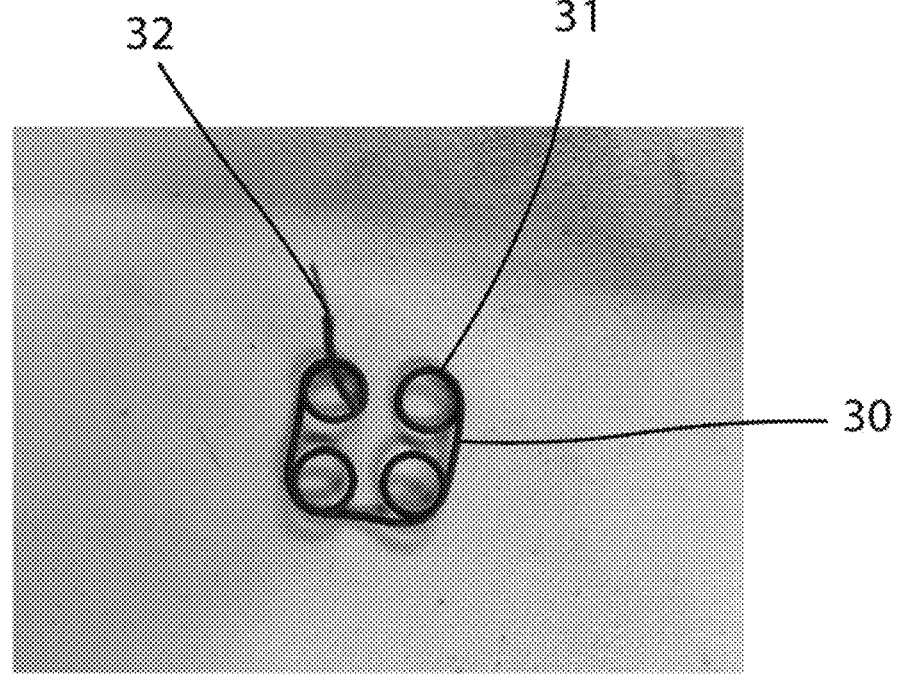
FIG. 5 shows a top view of an inductive pickup for a system for detecting aircraft magneto failure in accordance to one or more embodiments.
Figure 13:
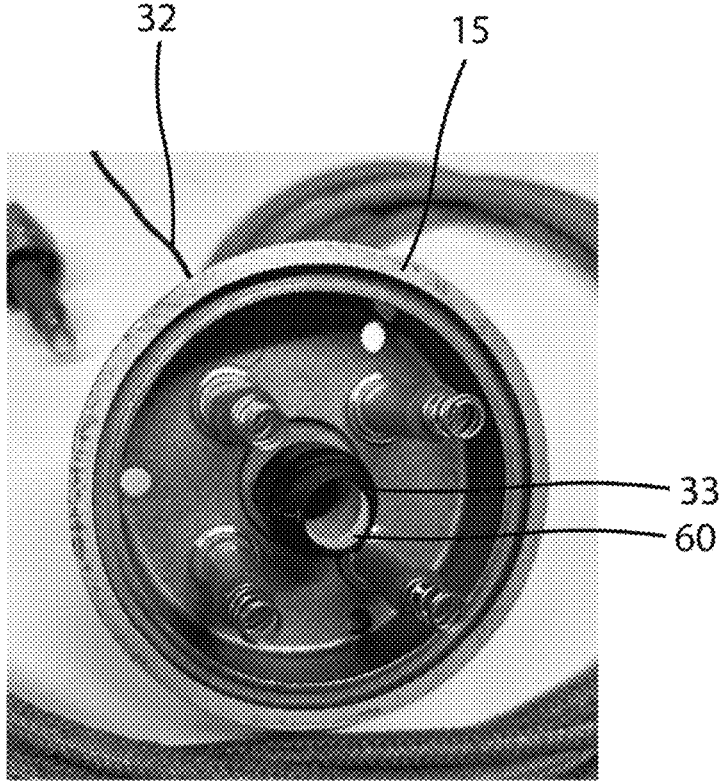
FIG. 13 shows another embodiment with the magneto removed showing a single inductive pickup installed on the spark plug wire harness in aircraft engines in accordance to one or more embodiments.

In embodiments, the system 10 can have an inductive pickup 30 which can have at least one coil 31 and at least one lead 32, as shown in FIG. 4 and FIG. 5, wherein a support structure 60, as shown in FIG. 13, can be used to keep the at least one coil tightly wound wherein the cylinder can be such as, for example, porcelain, wood, cardboard, plastic, ceramic, composite materials, or the like. The support structure 60 can have an outer diameter substantially corresponding to an inner diameter of the at least one coil, wherein the cylinder can be configured to support the at least one coil in a tightly wound configuration around the support structure.

Figure 12:
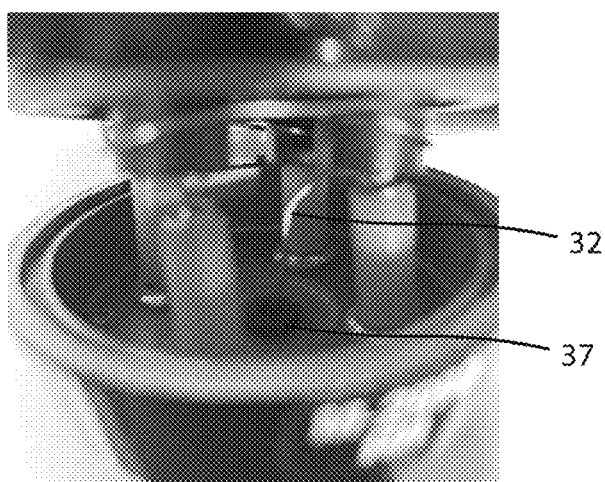
FIG. 12 shows a lead exiting out of the spark plug wire harness in aircraft engines in accordance to one or more embodiments.

The at least one coil 31 can be wrapped around the at least one terminal 25 and can be such as, for example, coupled to, sandwiched between, positioned between or the like the magneto 22 and the spark plug wire harness 15 as shown in FIG. 12. In the preferred embodiment, the at least one coil 31 can comprise a wound coil having multiple turns of at least 18-gauge wire, wherein the number of turns may range from approximately 1 turn to 20 turns depending on the desired electrical and/or antenna pickup characteristics. In alternative embodiments, the at least one coil can comprise of such as, for example, 12-gauge, 14-gauge, 16-gauge, 20-gauge, 22-gauge, or any other suitable gauge wire, wherein the wire gauge is selected based on factors including current carrying capacity, space constraints, and desired inductance characteristics. The wire may be insulated copper wire or other conductive material suitable for electromagnetic applications.

In embodiments, the at least one coil 31 can be configured to maximize sensitivity to an oscillating electric field wherein when the at least one coil 31 is positioned proximate to a voltage source, the oscillating electric field can induce a corresponding voltage in the at least one coil 31, wherein the coil 31 can function as an antenna element picking up the voltage source from the magneto. The oscillating electric field from the voltage source can induce a corresponding voltage in the at least one coil 31, which can generate a current flow within the coil, producing a detectable electrical signal. The at least one coil 31 can function as an antenna element that picks up the oscillating electric field variations from the magneto voltage source, where the antenna's sensitivity to these field variations can enable detection of the magneto's operational characteristics. This electrical signal can be transmitted through the lead wire to maintain signal integrity while routing the signal from the inductive pickup location to a remote processing location. The electrical signal can be received at an input terminal of the converter, and/or interrogator, and/or monitoring system, where the signal can undergo conditioning, amplification, and filtering to prepare it for analysis, enabling extraction of magneto operational characteristics, detection of performance anomalies, and identification of failure conditions.

Figure 6:
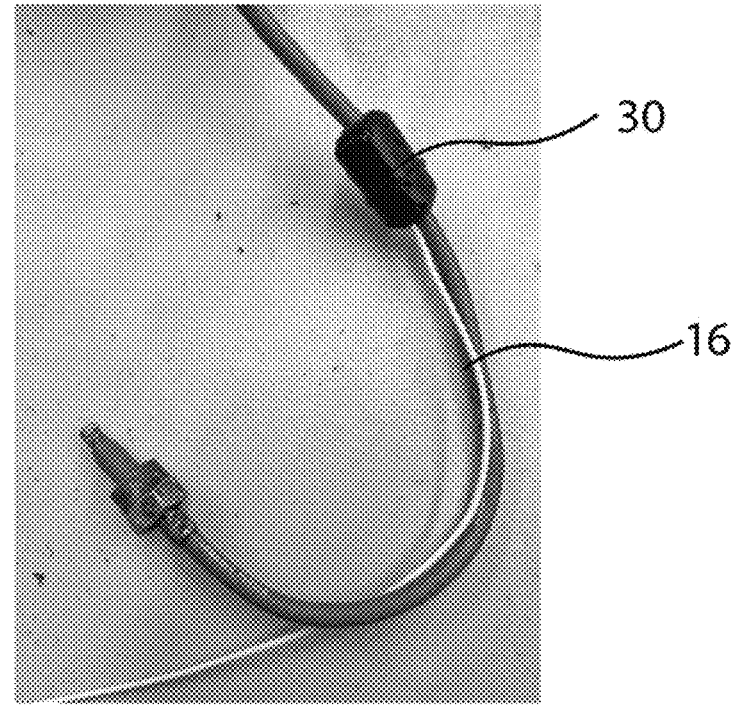
FIG. 6 shows a top view of another embodiment of an inductive pickup coupled to a spark plug wire for a system for detecting aircraft magneto failure in accordance to one or more embodiments.
Figure 7:
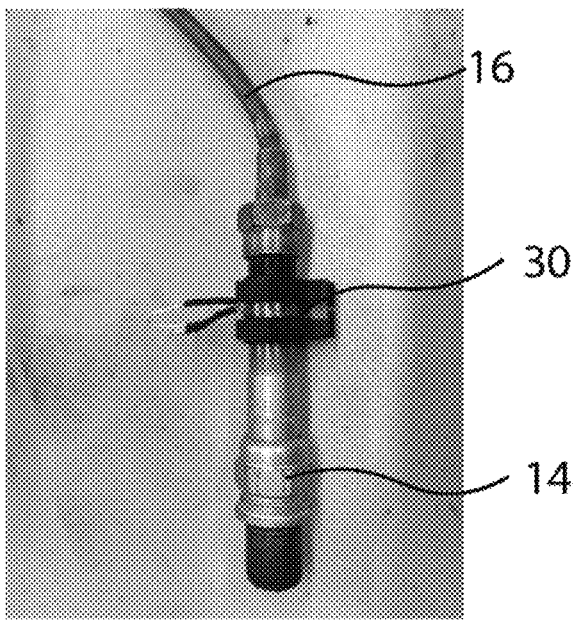
FIG. 7 shows a top view of another embodiment of an inductive pickup coupled to a spark plug for a system for detecting aircraft magneto failure in accordance to one or more embodiments.
Figure 8:
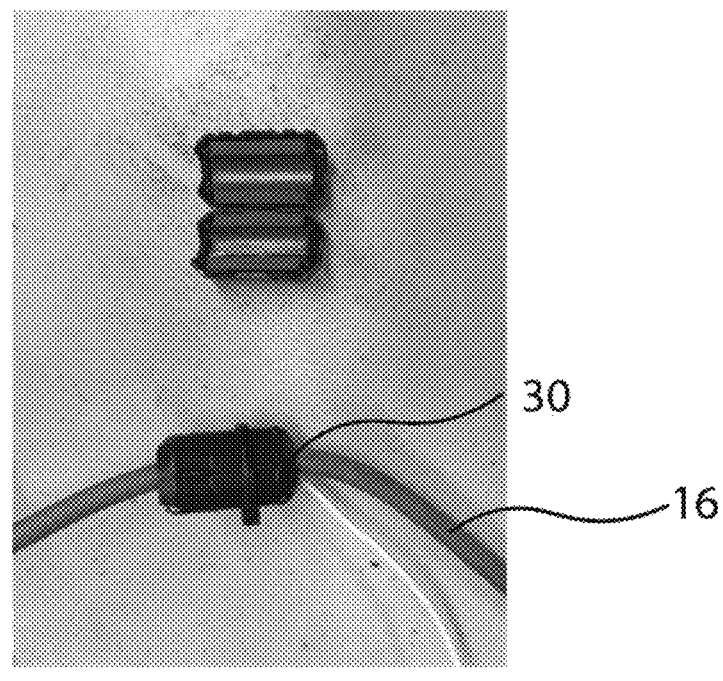
FIG. 8 shows a top view of another embodiment of an inductive pickup coupled to a spark plug wire for a system for detecting aircraft magneto failure in accordance to one or more embodiments.

In other embodiments, the inductive pickup 30 can be removably coupled to such as, for example, the at least one spark plugs 14, at least one spark plug lead 16, or the like as shown in FIGS. 6-8, or in other embodiments, it can be coupled to the center of spark plug wire harness 15 or on a center stem 27 of the distributor block 23. The inductive pickup 30 may comprise various electromagnetic field detection devices including, but not limited to, coiled wire, a coiled antenna, a ferrite core inductor, a toroidal transformer, a clamp-on current sensor, a magnetic field sensor, a Hall effect sensor, or any other antenna-based electromagnetic field detection device capable of wirelessly sensing the oscillating electric and magnetic field variations generated by current flow through the spark plug lead 16 and transmitting corresponding electromagnetic signals to a remote monitoring system.

Figure 2:
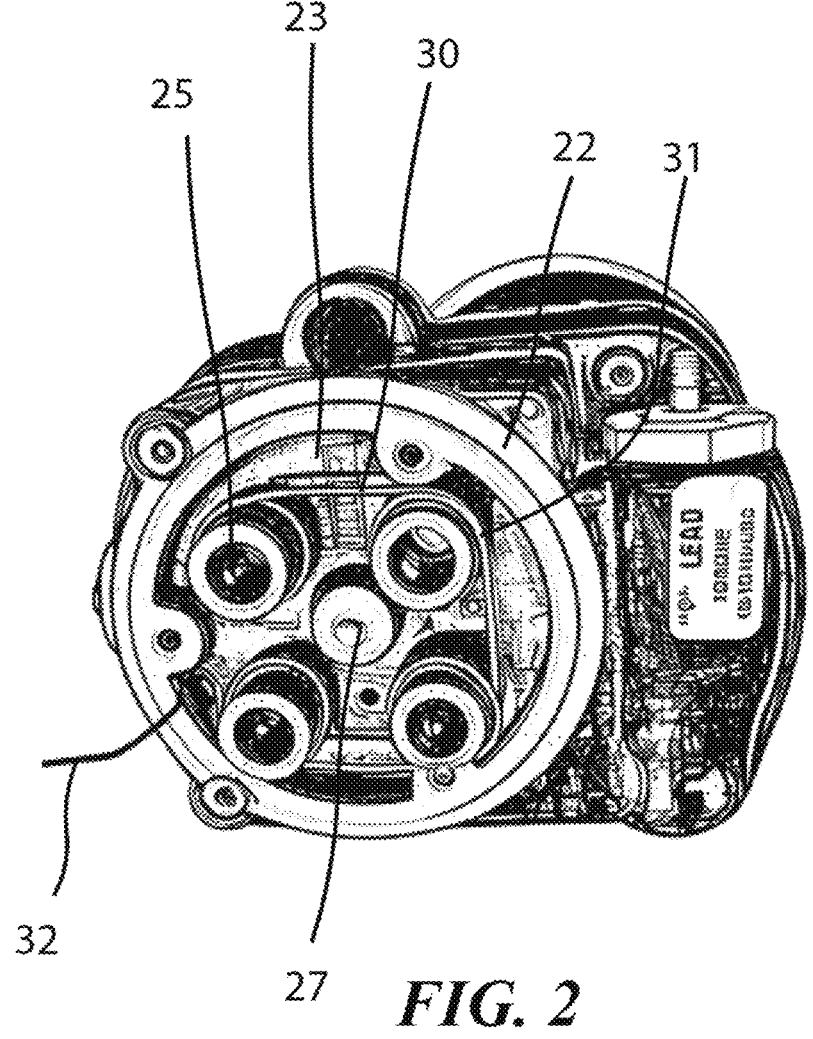
FIG. 2 shows the magneto with the spark plug wire harness removed showing the inductive pickup in accordance to one or more embodiments.
Figure 3:
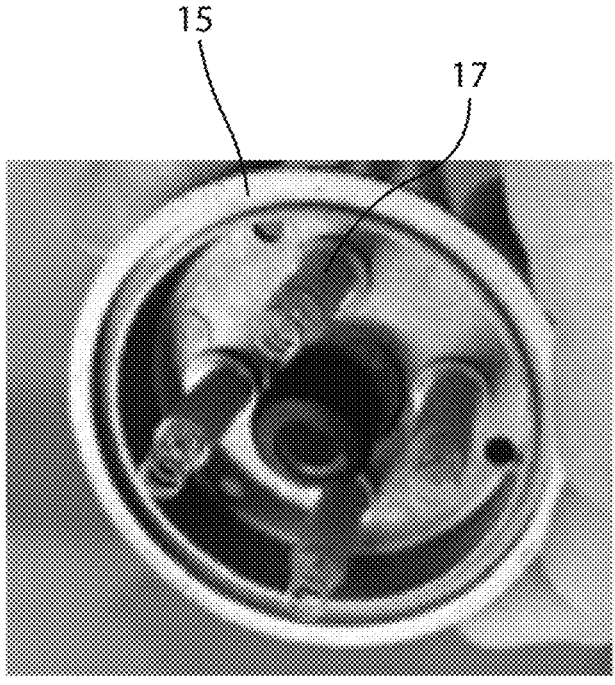
FIG. 3 shows the spark plug wire harness removed showing the inductive pickup in accordance to one or more embodiments.
Figure 11:
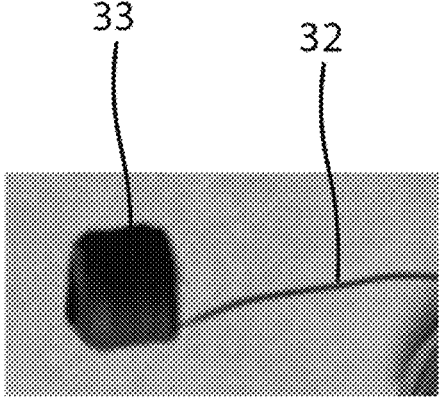
FIG. 11 shows the spark plug wire harness removed showing a single inductive pickup in aircraft engines in accordance to one or more embodiments.

The inductive pickup 30 can be coupled to one or more of the following components such as, for example, the spark plug 14 as shown FIG. 1, the center stem 27 of distributor block 23 as shown in FIG. 2, the center conductor of the spark plug wire harness as shown FIG. 3, or the like. The coupling can be achieved through various attachment mechanisms including, such as, for example, adhesive bonding, mechanical fasteners, clamps, magnetic attachment, mounting brackets, zip ties, hook and loop fasteners, or the like. In alternative embodiments, the at least one coil 31 of the inductive pickup 30 is configured to function as a spring clamp mechanism. In such configurations, a user can manually expand the coil to open the pickup device, position it around the target component, and then release the coil to allow it to contract and securely engage the component through spring tension. In other embodiments, the at least one coil 31 can be secured to the support structure 60 as illustrated in FIG. 13. In this configuration, the at least one coil 31 may be encapsulated with insulative material, such as heat shrink tubing 33 or similar protective covering as shown FIG. 11 and FIG. 13. The support structure 60 can be such as, for example, a porcelain cylinder, ceramic tube, plastic housing, metal bracket, insulating rod, non-conductive mounting post, or other electrically insulative structural element configured to provide mechanical support for the least one coil.

In other embodiments, the inductive pickup 30 can operate on the principle of electromagnetic induction to detect oscillating electric and magnetic field variations generated by current flow through the distributor block 23 and/or at least one plug wires 17 without requiring direct electrical contact, wherein the inductive pickup 30 functions as both a field sensor and a wireless antenna to transmit electromagnetic signals carrying detectable information to a remote monitoring system. When electrical current flows through the magneto 22 and the at least one plug wires 17 during ignition events, a time-varying magnetic field around the conductor can be generated according to Ampère's law wherein the magnetic field extends radially outward from the distributor block 23 and/or at least one plug wires 17 and varies in strength proportional to the magnitude and rate of change of the current flowing through the lead.

In embodiments, the at least one coil 31 can be positioned around the at least one terminal 25 and sandwiched between the magneto 22 and the spark plug wire harness 15. The oscillating electric fields generated by the magneto voltage source can induce a corresponding voltage within the at least one coil as the coil functions as an antenna element, and this induced voltage can generate a current flow through the coil windings, thereby generating a detectable electrical signal. The at least one coil can detect and respond to these oscillating electric fields by producing both an induced voltage and a corresponding current that can be transmitted through the lead wire to the signal processing system 41 for processing and analysis. The magnitude of the induced voltage within the at least one coil can range from approximately 0.2 volts to 5 volts, more preferably from approximately 0.5 volts to 2 volts, and even more preferably approximately 0.7 volts, where these voltage levels can be sufficient for reliable detection and processing by the signal conditioning circuitry while avoiding saturation or clipping of the signal. According to the principle of electromagnetic field detection and antenna theory, when the at least one coil 31 is positioned proximate to the oscillating electric and magnetic fields generated by current flow through the at least one plug wires 17 to the at least one spark plug 14, the at least on coil 31 can function as an antenna element that captures these field variations and converts them into induced voltages. The magnitude of this induced voltage corresponds to the intensity and frequency characteristics of the oscillating electromagnetic fields, wherein the at least one coil 31 simultaneously acts as both a field sensor and a wireless transmitter, generating electromagnetic radiation that carries detectable signals corresponding to the electrical activity within the ignition system. The system 10 can work on both an AC system and/or a DC system and the electromagnetic field can be such as, for example, electrical magnetic energy, static magnetic field, time-varying magnetic field, high-frequency EM pulses, frequency such as radio, microwave, infrared, and near-field and far field, or the like.

During normal magneto 22 operation, the current pulses create oscillating electromagnetic field variations that are detected by the inductive pickup 30 functioning as an antenna element or an antenna receiving a signal and then current is created within the inductive pickup. The at least one coil 31 can capture the electromagnetic field variations and converts them into induced voltages, which can generate corresponding currents that create electromagnetic radiation carrying detectable signals wirelessly transmitted to at least one signal processing system 41 which can comprise a converter 36 and/or interrogator 42. The amplitude, timing, and waveform characteristics of the wirelessly transmitted signals can provide information about the strength, timing, and quality of the ignition pulses, thereby enabling the remote monitoring system to detect magneto 22 performance degradation and/or failure when the transmitted electromagnetic field and/or signals deviate from expected parameters. The system 10 can eliminate the need for direct electrical connections while maintaining sensitivity to the oscillating electromagnetic fields generated by the ignition system, allowing for non-invasive wireless monitoring of engine performance characteristics.

In embodiments, the at least one lead 32 can exit the assembly through several routing configurations to accommodate various installation requirements and environmental conditions. The at least one lead 32 can exit from the interface region between the spark plug wire harness 15 and the magneto 22, utilizing the natural separation or gap between these components as an exit pathway wherein this configuration can minimize the need for additional modifications to existing components while providing adequate protection for the lead. In other embodiments, a dedicated aperture can be precisely drilled into the spark plug wire harness 15 to create an exit point for the lead 32. The diameter and location of this drilled aperture can be optimized based on the lead specifications and routing requirements. In another embodiment, the lead 32 can be routed through one of the existing mounting screw holes in the assembly, wherein a protective bushing 37, as shown in FIG. 12, can be installed within the hole to prevent mechanical damage, provide electrical insulation, and ensure proper strain relief for the lead. In certain embodiments, after the lead 32 is positioned, the hole can be filled or sealed with such as, for example, adhesive compound to provide environmental protection against moisture, dust, and other contaminants, a grommet to provide strain relief and seal the lead entry point, a potting compound to encapsulate electrical connections, an epoxy resin to provide rigid environmental sealing, a silicone sealant to provide flexible weather resistance, a rubber boot to protect exposed terminals, or a heat-shrink tubing to provide insulation and environmental protection, or the like. The material to fill the hole should be selected for compatibility with the operating temperature range, chemical environment, and mechanical stress conditions of the ignition system.

Figure 9:
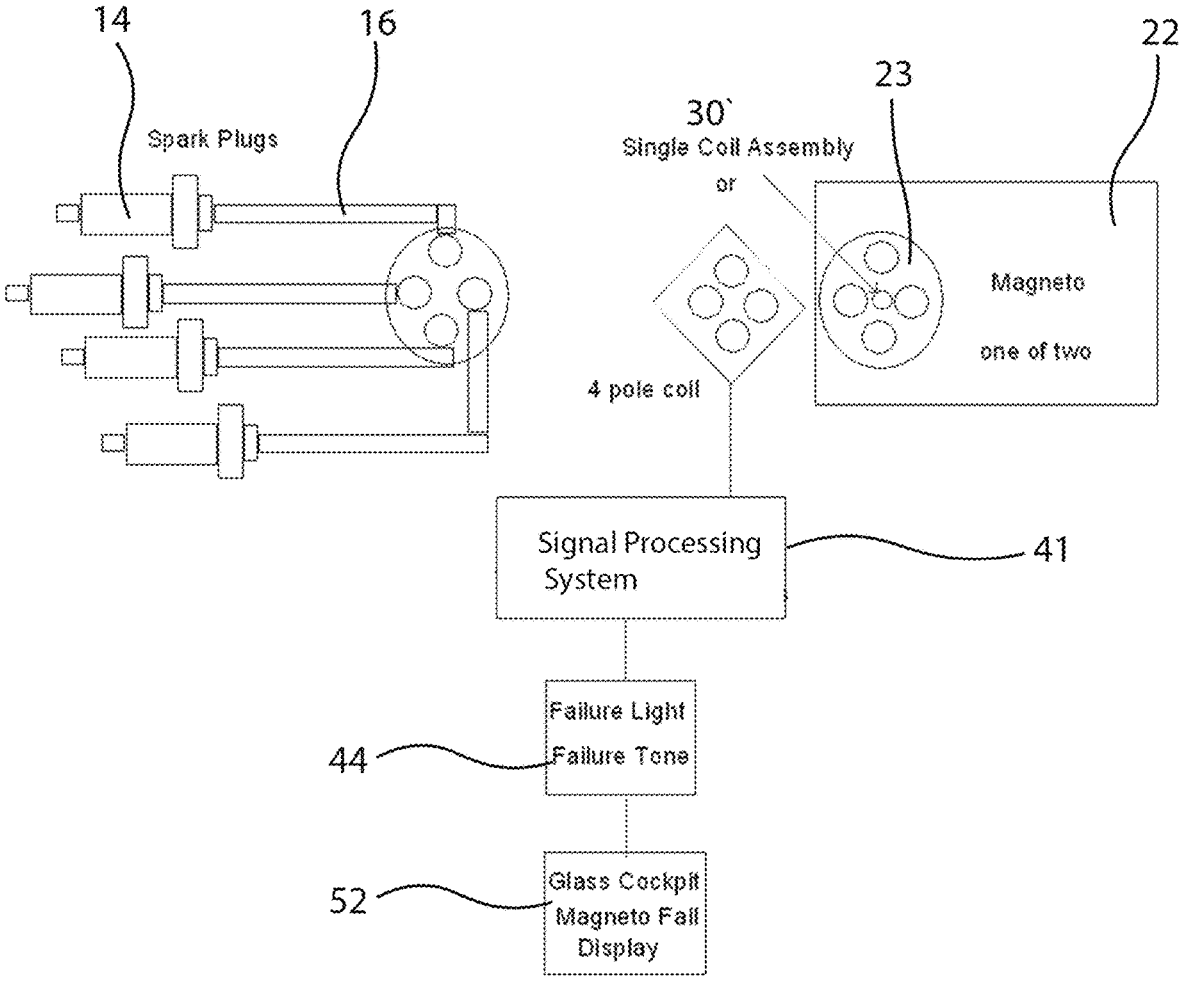
FIG. 9 shows a diagram of another embodiment of a system for detecting magneto failure in aircraft engines in accordance to one or more embodiments.
Figure 10:
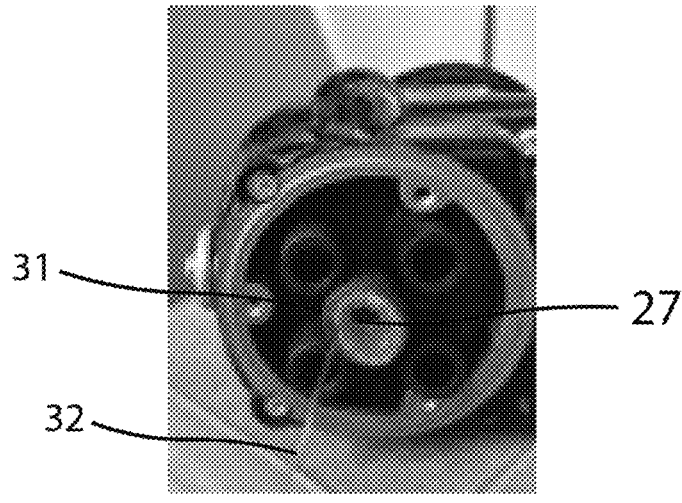
FIG. 10 shows another embodiment with the spark plug wire harness removed showing a single inductive pickup installed on the magneto in aircraft engines in accordance to one or more embodiments.

In embodiments, the at least one lead 32 can be coupled the at least one signal processing system 41. In other embodiments, the at least one lead can be coupled to the converter 36 and/or the interrogator 42 wherein the converter and/or interrogator can have at least one input terminal for the at least one lead to be coupled to. The converter 36 can have at least one input terminal 34 and at least one output terminal 38 wherein the at least one input terminal can be coupled to the at least one lead 32. The converter 36 can be coupled to more than one inductive pickup 30 allowing it to be coupled to more than one magneto 22. The at least one output terminal 38 can be coupled to the interrogator 42 through a second signal path 40, wherein the interrogator 42 can be configured to analyze a processed signal received from the converter 36. In certain embodiments, the converter 36 can be omitted and the interrogator can be coupled directly to the at least one lead 32 or in other embodiments, the converter and the interrogator can be combined into one unit allowing the user to save space within engine compartment or electrical panel of the aircraft, as shown in FIG. 9.

In embodiments, the converter 36 can be a circuit that can amplify the signal from the inductive pickup 30 to at least 0.7 volts, and in other embodiments the converter can amplify the signal to at least 0.1 volts, or in further embodiments can amplify the signal to a range of 0.07 to 5.0 volts or from 0.07 to 15 volts, or from 0.07 to 20 volts, and in additional embodiments the converter can include signal conditioning circuitry to filter noise and provide a clean digital output signal, and in yet other embodiments the converter can incorporate timing measurement capabilities to determine ignition timing relative to engine position. In other embodiments, the converter 36 can include analog-to-digital conversion functionality to digitize the amplified signal for processing by external equipment, and in certain embodiments the converter can provide signal isolation to prevent electrical interference between the ignition system and connected diagnostic equipment, and in alternative embodiments the converter can include multiple amplification stages with adjustable gain settings to accommodate different signal strengths from various aircraft engine configurations In embodiments, the converter 28 can be such as, for example, a custom circuit, a signal conditioning module, analog-to-digital converter, voltage level shifter, impedance matching circuit, frequency converter, signal amplifier, isolation transformer, printed circuit board assembly, integrated circuit module, microcontroller-based processing unit, field-programmable gate array (FPGA), application-specific integrated circuit (ASIC), or the like configured to process, condition, amplify, filter, convert, and transmit electromagnetic signals from the inductive pickup into a suitable format for analysis by the interrogator. The converter 36 can have an analog-to-digital conversion stage that can be configured to convert the filtered analog signals into digital format for processing by the interrogator 42. The analog-to-digital converter (ADC) can operate at a sampling rate that can capture transient ignition events, which can typically range from 100 kHz to 1 MHz sampling frequency. The ADC can have such as, for example, a successive approximation register (SAR) type converter, delta-sigma converter, flash converter, or the like depending on the required resolution and speed specifications. In certain embodiments, the ADC subsystem can further comprise programmable gain amplification stages preceding the conversion elements, allowing for dynamic range optimization based on the amplitude characteristics of the incoming signals. The programmable gain amplifiers (PGAs) can be digitally controlled by the interrogator 42 wherein the interrogator can automatically adjust signal levels, ensure optimal utilization of the ADC's full-scale range while preventing saturation during high-amplitude ignition events.

In certain embodiments, the signal conditioning elements within the ADC stage can have an anti-aliasing filter which can be configured to prevent frequency folding artifacts that could compromise measurement accuracy. The anti-aliasing filters can be designed with cutoff frequencies and roll-off characteristics matched to the selected sampling rate and the expected frequency content of the ignition signals. The anti-aliasing filters can utilize active or passive topologies, with the specific design optimized for minimal phase distortion and group delay variation across the signal bandwidth of interest.

In embodiments, the interrogator 42 can verify whether there is a high and voltage present wherein the interrogator can be such as, for example, a custom circuit board, a microcontroller-based circuit, a digital signal processor, a field-programmable gate array (FPGA), an application-specific integrated circuit (ASIC), a programmable logic controller (PLC), or the like, and in other embodiments the interrogator can include voltage detection circuitry configured to detect voltage levels ranging from 1,000 to 30,000 volts, and in further embodiments the interrogator can incorporate optical isolation components to safely interface with high voltage ignition systems, and in additional embodiments the interrogator can include memory storage for recording voltage measurements and timing data, and in some embodiments the interrogator can provide real-time monitoring and analysis of ignition system performance. In certain embodiments the interrogator 42 and/or converter 36 can communicate with external diagnostic equipment via wireless or wired communication protocols such as USB, Bluetooth, Wi-Fi, or CAN bus, and in alternative embodiments the interrogator can include a user interface with display capabilities for presenting voltage readings and system status information. The interrogator 42 and/or converter 36, or the combination of both, can include a at least one input and/or output terminals configured to receive the at least one lead 32 from multiple inductive pickups. For aircraft configurations having multiple magnetos on multiple engines, the system can be configured to have at least one signal processing system 41 for each engine with input terminals that enable simultaneous detection of magneto failure on more than one engine, allowing comprehensive multi-engine magneto monitoring from a single signal processing system.

In embodiments, the system 10 can further comprise at least one user feedback mechanism to provide clear indication of magneto 22 operational status. The system 10 can comprise at least one indicator light 44 that can be operatively coupled to the at least one signal processing system 41 to provide visual feedback regarding magneto 22 performance. The indicator light 44 can be configured to illuminate green when the interrogator detects proper magneto 22 operation, indicating that the magneto system is functioning within acceptable parameters. Conversely, the indicator light 44 can illuminate red when the at least one signal processing system 41 detects a failure or malfunction with the magneto 22, providing immediate visual warning to aircraft operators.

In certain embodiments, the system 10 can further comprise an audible tone generator 46. The audible tone generator 46 can be configured to produce distinctive audible alerts when magneto 22 failure conditions are detected by the interrogator 42 wherein the tone generator can be coupled to a tone override switch 50 which can turn off or on the audile alert. This dual-mode feedback system ensures that operators receive both visual and audible notification of magneto 22 status, improving situational awareness and safety during aircraft operations.

Figure 14:
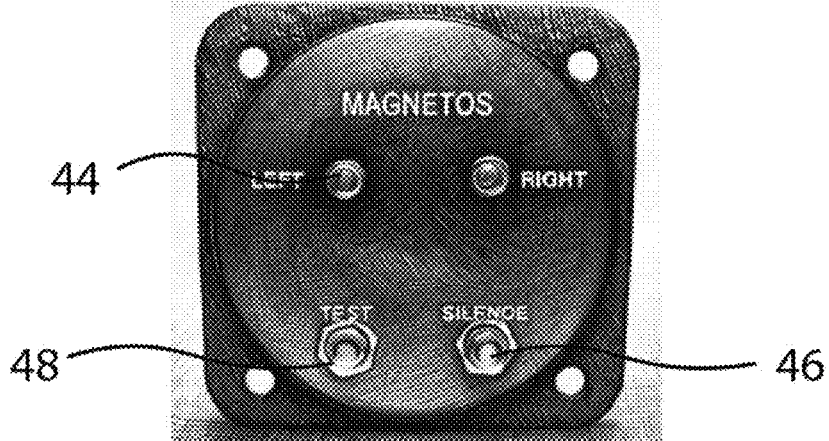
FIG. 14 shows a magneto test display panel of a system for detecting magneto failure in aircraft engines in accordance to one or more embodiments.

Referring to FIG. 14, the system 10 can further comprise a test button or a remote monitor 48 that is operatively connected to the at least one signal processing system 41. The test button 48 can be configured to initiate a magneto 22 test sequence when actuated by an operator, allowing for on-demand verification of magneto 22 performance during flight or on the ground. The test button 48 can comprise a manual switch mechanism that can enable a operator to selectively test magneto performance at any time during pre-flight checks, maintenance procedures, or in-flight.

In certain embodiments, the at least one signal processing system 41 can comprise real-time monitoring of magneto 22 signals without processing delays, allowing for immediate assessment of magneto performance characteristics. The interrogator 42 can provide continuous real-time display of magneto 22 signal characteristics for diagnostic purposes, enabling maintenance personnel to observe detailed signal patterns and identify potential issues before they result in complete system failure.

In other embodiments, the converter 36 can have a specialized signal conditioning circuit that can be configured to amplify and filter signals received from the inductive pickup 30 before transmission to the interrogator 42 wherein the signal conditioning ensures that the interrogator receives clean, properly conditioned signals for accurate analysis. The signal conditioning circuit includes sophisticated band-pass filtering capabilities designed to isolate ignition-related frequencies while effectively rejecting electromagnetic interference from other aircraft systems, ensuring reliable operation in the complex electromagnetic environment of modern aircraft.

In embodiments, the system 10 can comprise a power source wherein the power source can accommodate various aircraft configurations and installation requirements. The power source can be such as, for example, USB device connection, external 5-volt power supply, lithium battery, or the like. The voltage and/or current threshold levels used for performance assessment can be adjustable to accommodate different aircraft engine types and magneto specifications. This adjustability ensures that the system can be properly calibrated for optimal performance across a wide range of aircraft platforms and engine configurations.

The interrogator 42 can have a communication interface that can be configured to transmit magneto 22 status information to external aircraft monitoring systems wherein the communication capability enables integration with existing aircraft health monitoring systems and allows for remote monitoring and data logging of magneto performance. The system 10 can be configured to detect multiple magneto 22 simultaneously in multi-engine aircraft configurations wherein this capability is essential for twin-engine and multi-engine aircraft where multiple magneto systems must be monitored concurrently. Each magneto 22 can include independent monitoring channels with individual status indicators, ensuring that operators can quickly identify which specific magneto system may be experiencing issues in multi-engine installations.

A method for installing a magneto monitoring system on an aircraft engine, the method can comprise removing spark plug harnesses 15 from each magneto 22 assembly to be monitored, then installing a inductive pickup 30 through a substantially 3/16 inch diameter aperture formed in a central portion of each spark plug wiring harness, wherein said inductive pickup can be secured using a rubber bushing, followed by reinstalling the spark plug harnesses onto their respective magneto assemblies.

The method can further comprise mounting a converter 36 and/or an interrogator 42 at a predetermined location within the aircraft, wherein the location can be selected from the group consisting of an inside firewall position and any structurally suitable mounting location accessible for electrical connections, and subsequently electrically connecting each pickup coil lead from each magneto assembly to the control box using a supplied connecting cable and an electronic ignition splice connector. When the aircraft utilizes analog steam gauge instrumentation, the method can include installing a remote display unit and establishing electrical communication between the control box and either a glass cockpit display system or the remote display unit, depending upon the aircraft's instrumentation configuration.

The method additionally comprises programming input terminals of glass cockpit systems according to manufacturer specifications, wherein the system can be configured to indicate magneto 22 failure conditions including left magneto failure and right magneto failure states, configuring the control box to output a negative electrical signal, wherein alternative output configurations are available upon specification, and providing electrical power to the system by connecting a Universal Serial Bus (USB) cable to a power source selected from the group consisting of a USB connection and an external battery pack.

The method can further include conducting a comprehensive system verification process, wherein the installation can be validated through a series of operational tests performed with the aircraft engine in both running and non-running conditions. The verification process can comprise initiating a ground test sequence by starting the aircraft engine and systematically switching between left magneto, right magneto, and dual magneto operation modes while monitoring the display outputs for proper magneto status indication, ensuring that the pickup coils accurately detect and transmit magneto firing signals to the control box, and confirming that failure simulation tests produce appropriate warning displays on either the glass cockpit system or remote display unit. The method can additionally require performing a pre-flight functionality check by powering the system without engine operation to verify proper startup sequences, display illumination, and system self-diagnostic capabilities, followed by documenting the installation completion through recording of system serial numbers, calibration settings, and configuration parameters in the aircraft maintenance logbook. Upon successful verification, the method concludes with conducting a final inspection to ensure all electrical connections are properly secured, all mounting hardware meets torque specifications.

In embodiments, a method of detecting a failure in an ignition system of an engine can be provided, where the ignition system can comprise an ignition component having a magneto and a distributor block. The method can comprise the acts of providing at least one inductive pickup comprising at least one coil and at least one lead, positioning the at least one coil to capture an electromagnetic field such that the at least one coil can generate an electrical signal in response to the captured electromagnetic field, receiving the electrical signal from the at least one lead at at least one signal processing system comprising at least one input terminal, and processing the electrical signal to detect degradation or failure of the magneto.

The method can further comprise expanding the at least one coil to open and positioning the expanded at least one coil around a component consisting of at least one of a terminal, a center stem, a center of a spark plug wire harness, or a spark plug, and releasing the expanded at least one coil to allow the at least one coil to contract and securely engage the component through spring tension. The method can further comprise running the at least one lead through at least one aperture on a spark plug wire harness.

Where the at least one signal processing system can comprise an interrogator and/or a converter having a signal conditioning circuit, the method can further comprise amplifying and filtering the electrical signal before transmitting the electrical signal to the interrogator. The signal conditioning circuit can include bandpass filtering that can isolate electromagnetic signatures from high voltage sources detected via electromagnetic induction through the inductive pickup, where the filtering can reject interference from other aircraft systems while passing frequencies corresponding to oscillating electric fields that can induce voltage variations in the inductive pickup.

The method can further comprise displaying an alert by at least one of illuminating at least one indicator light with a first color when the interrogator detects proper magneto operation and illuminating the at least one indicator light a second color when the interrogator detects a failure and producing an audible alert when the interrogator detects a failure. The indicator light can provide immediate visual feedback that can be positioned in the pilot's field of view, where the first color can be green, blue, or white to indicate normal operation, and the second color can be red, amber, or yellow to indicate a failure condition, enabling rapid visual assessment of magneto health. The audible alert can comprise a tone, buzzer, chime, or voice alert that can be distinct from other aircraft warning sounds, and the audible alert can be configured with adjustable volume levels to ensure audibility in various flight conditions and noise environments. The alert system can provide tiered warning levels, where the system can indicate different alert severities such as advisory warnings for minor degradation, caution alerts for significant performance reduction, and critical warnings for complete magneto failure, allowing the pilot to assess the urgency of the situation and respond appropriately.

The method can further comprise continuously monitoring magneto performance and providing real-time feedback regarding the magneto performance. The continuous monitoring can occur throughout all phases of engine operation including startup, idle, cruise, and shutdown, enabling detection of performance variations that may only manifest under specific operating conditions. The real-time feedback can include displaying magneto pulse timing, pulse amplitude, pulse frequency, and pulse consistency on a display screen or through the indicator lights, where deviations from normal operational parameters can be immediately visible to the operator. The continuous monitoring can detect intermittent failures that might be missed during periodic manual testing, can identify gradual degradation trends over time that may indicate impending failure, and can provide ongoing verification of ignition system health without requiring pilot intervention or manual test procedures. The monitoring system can store performance data over time to establish baseline performance characteristics for each monitored magneto, and the system can compare current performance against these baselines to detect subtle changes that may indicate developing problems before they result in complete failure.

The method can further comprise transmitting magneto status information to external aircraft monitoring systems. The transmitted information can include real-time operational status, historical performance data, diagnostic fault codes, alert conditions, and trend analysis data that can be received by avionics systems, engine monitoring computers, flight data recorders, or ground-based maintenance tracking systems. The transmission can occur through wired interfaces such as ARINC 429, CAN bus, or RS-232 connections, or through wireless interfaces such as Bluetooth, Wi-Fi, or cellular data links where available. The external aircraft monitoring systems can integrate the magneto status information with other aircraft health monitoring data to provide comprehensive situational awareness, can log the information for maintenance record keeping and regulatory compliance, and can enable predictive maintenance strategies by identifying magneto degradation patterns before failures occur. The transmitted data can be time-stamped and correlated with engine operating parameters such as RPM, manifold pressure, and temperature to facilitate root cause analysis when performance anomalies are detected.

Where the at least one inductive pickup can comprise a first inductive pickup and a second inductive pickup, the method can further comprise positioning the first inductive pickup on a first engine and the second inductive pickup on a second engine and detecting the magneto status of the first engine and the second engine simultaneously. Each inductive pickup can be independently coupled to the signal processing system through separate leads, where the signal processing system can include multiple input channels that can simultaneously receive and process signals from multiple inductive pickups without cross-talk or signal interference between channels. The simultaneous detection can enable real-time comparison of magneto performance between engines, allowing identification of relative performance differences that may indicate degradation in one magneto relative to another. For twin-engine aircraft configurations, the method can provide redundant monitoring that ensures continued magneto health awareness even if one monitoring channel experiences a fault.

The independent monitoring of multiple engines can enable the system to detect systemic issues affecting multiple magnetos, such as environmental factors, vibration patterns, or electrical interference that may be impacting ignition system performance across the aircraft. The signal processing system can display the status of all monitored magnetos simultaneously on a single display interface or can provide individual indicator lights for each engine's magneto system, giving pilots comprehensive awareness of ignition system health across all powerplants. In aircraft with more than two engines, the system can be expanded to include additional inductive pickups positioned on third and fourth engines, where each engine's magneto system can be independently monitored while maintaining centralized display and alert functions.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

We claim:

1. A system for detecting a failure in an ignition system of an engine, the ignition system comprising an ignition component having a magneto coupled to a distributor block, the system comprising:

at least one inductive pickup comprising at least one coil and at least one lead, wherein the at least one coil when placed near the magneto captures an electromagnetic field, and wherein the at least one coil generates an electrical signal in response to the captured electromagnetic field;

at least one signal processing system coupled to the at least one inductive pickup, the at least one signal processing system comprising at least one input terminal that receives the electrical signal from the at least one lead, wherein the signal processing system processes the electrical signal to detect degradation or failure of the magneto.

2. The system of claim 1, wherein the at least one signal processing system comprises a converter and/or an interrogator.

3. The system of claim 1, wherein the at least one coil is sized to wind around the at least one terminal to form an inductive pickup antenna that detects varying magnetic fields generated by the voltage source.

4. The system of claim 2, wherein the at least one signal processing system further comprises a signal conditioning circuit configured to amplify and filter the signal received from the inductive pickup before transmission to the interrogator.

5. The system of claim 2, wherein the at least one signal processing system is coupled to at least one of:

at least one indicator light, wherein the at least one indicator light illuminates a color when the interrogator detects proper magneto operation and illuminates a different color when the interrogator detects a failure; and an audible tone generator that produces an audible alert when the interrogator detects a failure.

6. The system of claim 2, wherein the system further comprises a test button operatively connected to the interrogator, wherein the test button initiates a magneto test sequence when actuated.

7. The system of claim 1, wherein the at least one signal processing system includes an override function that enables real-time monitoring of magneto signals without processing delays.

8. The system of claim 1, wherein the at least one signal processing system continuously monitors magneto performance and provide real-time feedback regarding operational status.

9. The system of claim 1, wherein the at least one signal processing system includes a communication interface configured to transmit magneto status information to external aircraft monitoring systems.

10. The system of claim 1, wherein the at least one inductive pickup comprises a first inductive pickup and a second inductive pickup to detect multiple magneto systems simultaneously in multi-engine aircraft configurations.

11. The system of claim 10, wherein the at least one signal processing system comprises a first signal processing system coupled to the first inductive pickup and a second signal processing system coupled to the second inductive pickup, wherein the first signal processing system and the second signal processing system are independent.

12. A method of detecting a failure in an ignition system of an engine, the ignition system comprising an ignition component having a magneto and a distributor block, the method comprising the acts of:

providing at least one inductive pickup comprising at least one coil and at least one lead;

positioning the at least one coil to capture an electromagnetic field such that the at least one coil generates an electrical signal in response to the captured electromagnetic field;

receiving the electric field from the at least one lead at least one signal processing system comprising at least one input terminal; and processing the electrical signal to detect degradation or failure of the magneto.

13. The method of claim 12, further comprising expanding the at least one coil to open and positioning the expanded at least one coil around a component consisting of at least one of a terminal, a center stem, a center of a spark plug wire harness, or a spark plug;

releasing the expanded at least one coil to allow the at least one coil to contract and securely engage the component through spring tension.

14. The method of claim 12, further comprising running the at least one lead through at least one aperture on a spark plug wire harness.

15. The method of claim 12 wherein the at least one signal processing system further comprises an interrogator and/or a converter having a signal conditioning circuit, the method further comprising amplifying and filtering the electrical signal before transmitting the electrical signal to the interrogator.

16. The method of claim 12 further comprising displaying an alert by at least one of illuminating at least one indicator light with a first color when the interrogator detects proper magneto operation and illuminating the at least one indicator light a second color when the interrogator detects a failure; and producing an audible alert when the interrogator detects a failure.

17. The method of claim 12 further comprising continuously monitoring magneto performance and providing real-time feedback regarding the magneto performance.

18. The method of claim 15, wherein the signal conditioning circuit includes bandpass filtering that isolates electromagnetic signatures from high voltage sources detected via electromagnetic induction through the inductive pickup, the filtering rejecting interference from other aircraft systems while passing frequencies corresponding to oscillating electric fields that induce voltage variations in the inductive pickup.

19. The method of claim 12 further comprising transmitting magneto status information to external aircraft monitoring systems.

20. The method of claim 12 wherein the at least one inductive pickup comprises a first inductive pickup and a second inductive pickup, the method further comprising positioning the first inductive pickup on a first engine and the second inductive pickup on a second engine and detecting the magneto status of the first engine and the second engine simultaneously.

\* \* \* \* \*